No. 885,055. PATENTED APR. 21, 1908.
E. C. KETCHUM.
LOCOMOTIVE.
APPLICATION FILED JULY 3, 1907.

Witnesses:
Roswell F. Hatch
Howard Hanscom

Inventor:
Ernest C. Ketchum,
by Walter E. Lombard,
Atty.

UNITED STATES PATENT OFFICE.

ERNEST C. KETCHUM, OF BOSTON, MASSACHUSETTS.

LOCOMOTIVE.

No. 885,055.  Specification of Letters Patent.  Patented April 21, 1908.

Application filed July 3, 1907. Serial No. 381,967.

*To all whom it may concern:*

Be it known that I, ERNEST C. KETCHUM, a citizen of the United States of America, and a resident of Boston, in the county of Suffolk and State of Massachusetts, have invented certain new and useful Improvements in Locomotives, of which the following is a specification.

This invention relates to electric locomotives and has for its object the production of a locomotive of this class in which the devices for generating electricity are wholly located upon the platform thereof.

It consists in mounting upon a platform driven by suitable motors a generator of electricity capable of being driven at a very high speed and connecting therewith a high power turbine engine capable of driving directly a dynamo of this class.

It consists further of mounting upon said movable platform the devices for generating steam for said turbine and condensing the exhaust therefrom.

It consists further in certain novel features of construction and arrangement of parts which will be readily understood by reference to the description of the drawings and to the claims hereinafter given.

Figure 1:
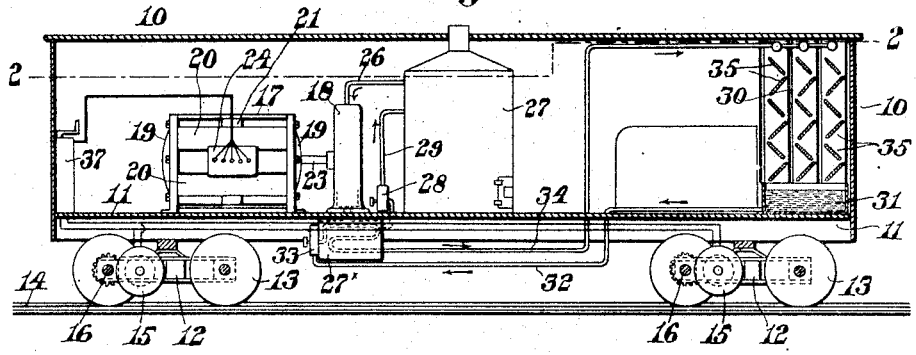
Figure 2:
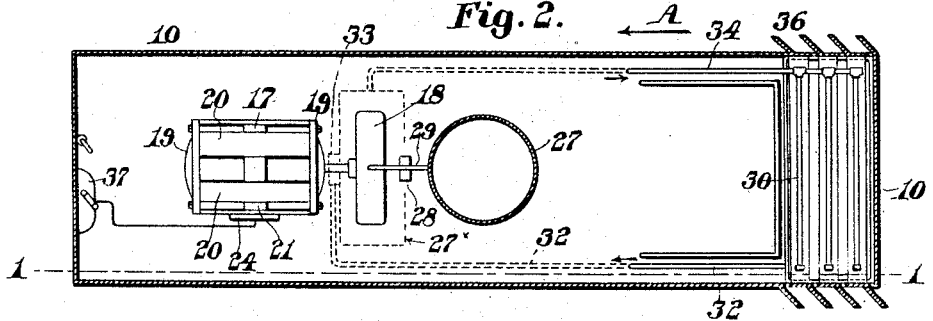
Figure 3:
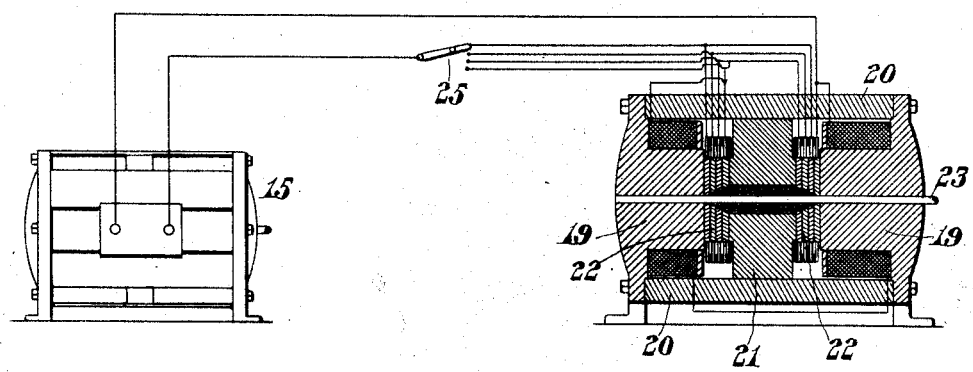

Of the drawings: Figure 1 represents a sectional view of an electric locomotive embodying the features of this invention. Fig. 2 represents a horizontal section of the same on line 2—2 on Fig. 1, and Fig. 3 represents a section of the dynamo used in the locomotive and an elevation of the motor operated thereby and showing in connection therewith the wire connections for making the electric circuit.

Similar characters designate like parts throughout the several figures of the drawings.

In the drawings, 10 represents a car of any well-known construction provided with the platform 11 mounted upon suitable trucks 12 the wheels 13 of which are adapted to be moved along the rails 14 by a motor 15 secured upon either truck 12 and geared to an axle 16 in any well-known manner.

Mounted upon the platform 11 is a direct current dynamo 17, as for instance one of the homopolar type the preferred form being that which is shown in Letters Patent No. 826,668, granted to me July 24, 1906, this dynamo being capable of being revolved at a very high rate of speed, thus permitting it to be driven direct from a high speed motor such as a turbine engine 18. This dynamo consists of the end pieces 19 supported on suitable legs and provided with inwardly extending cylindrical hubs which form cores or poles for the field. Interposed between and connecting said end pieces 19 are a plurality of members 20 united thereto by any suitable means. Intermediate the end pieces 19 is a member 21, supported by said members 20, either face of which is provided with a pole in alinement with each other and the poles of the end pieces 19. Interposed between the poles of said intermediate member 21 and the poles of the end pieces 19 and separated therefrom by suitable air spaces is an armature 22, said armature being driven by a shaft 23 supported in bearings in the end pieces 19. The shaft 23 is driven direct by means of the turbine engine 18 or other high speed motor. The armature 22 is composed of a plurality of disks of high magnetic permeability separated from each other by insulating plates.

The outer pair of disks are mounted directly upon an insulating tube secured directly to the revoluble shaft 23 and this pair of disks is connected by a tubular member extending from the inner face of one to the inner face of the other. This tubular member is surrounded by a tube of insulating material upon which is mounted the next pair of disks which pair is in turn connected by means of a second tubular member surrounding the insulating tube. All of the pairs of disks are mounted in a similar manner and the whole construction is as shown in the aforesaid patent. All of the disks are insulated from each other and are also insulated from the shafts on which they are mounted while the tubes upon the revoluble shaft 23 are also insulated from each other, each tube however serving as a connector between its own pair of disks. Suitable brushes connect with these revoluble disks and are wired in such a manner as to connect all of the disks in series, all as shown and described in the patent mentioned. Any portion of the disks may be cut out from the circuit by means of the operation of one of the switches of a controller 25 in an obvious manner. Inasmuch as the poles are all in alinement and the armature is also in alinement therewith, it is obvious that the working parts of the armature when in operation always move in a plane at right angles to the lines of force and are constantly cutting the same without producing a reversal of the current and a change of polarity in the armature. This construction, which dispenses with the wires which are usually used in an armature, permits the armature to be revolved at a high velocity without endangering the displacement in any of the elements which form the same. Such a construction as is herein shown permits the dynamo to be used in connection with a single stage impulse steam turbine, the armature of the dynamo being mounted directly upon the main driving shaft thereof without the use of gears or other intermediate devices. By such a construction, the dynamo, driven direct by the turbine engine, produces a greatly increased voltage and permits of its use upon a movable platform to drive the motor therefor as is herein shown and described.

Steam is admitted to the turbine 18 through the pipe 26 from a boiler 27 which may be of any well-known construction. The exhaust steam from said turbine passes through a condenser 27$^\times$ beneath the motor and from which it is forced by means of the pump 28 through the pipe 29 again into the boiler 27 in which it is again changed into steam to be again used in the turbine 18.

Mounted upon the platform 11 is a cooling tower 30 of any well-known construction provided at the bottom thereof with a tank 31 from which cool water is drawn through the pipe 32 by means of the pump 33 and forced through the condenser from which it is again ejected through the pipe 34 to be returned to the top of the cooling tower 30 where it passes from suitable nozzles over inclined shelves 35 or other similar devices while air from the exterior of the car is passing transversely through said tower, the air being drawn in by means of the side wings 36 which cause a current of air to be forced through the cooling tower as the car moves in the direction of the arrow A on Fig. 2, said air being emitted from the opposite side of the car or locomotive.

Interposed between the dynamo 24 and the motor 15 is a controller 37 which regulates, by means of the switch 25, the amount of electricity conveyed to the motor to drive the car. It is obvious that by such a construction as is herein shown an electric locomotive may readily be produced which will generate its own electricity without the assistance of instrumentalities removed from said car. As the steam is generated in a device mounted upon the platform of the locomotive and drives the high speed turbine engine, also mounted upon said platform, which engine in turn drives at a high speed the dynamo; as, moreover, means are also provided on the same platform for condensing the exhaust steam emitted from the motor and for forcing it through the boiler to be utilized again in the engine; and as provision is also made for suitable cooling devices to operate the condenser for said exhaust steam, it is obvious that the locomotive is complete in itself. This dispenses with the necessity of stationary plants which have to be connected by means of overhead or underground trolleys to a motor carried upon a movable platform with a great loss of electric energy, this loss in the present construction being reduced to a minimum. Moreover, owing to the fact that due to the direct connection between the dynamo and turbine, less prime power is needed to secure the requisite amount of electric energy, less fuel is required, causing a great economy thereof and in the storage space therefor.

It is obvious that the engine and dynamo will continue to operate without change of speed at all times, even when the train is stopped at a station and as a consequence no additional power is required to start the engine as is usually the case.

The many advantages of a locomotive driven by electricity, which may pass over any track whether electrically installed or not, it is believed will be fully apparent without any further description.

Having thus described my invention, I claim:

1. The combination of a car platform; trucks therefor; an electric motor for driving said trucks; a dynamo on said platform; a steam turbine on said platform for driving said dynamo; means for creating a continuous circulation of steam in said boiler and turbine; a water-cooled condenser into which the exhaust from the turbine passes; a connecting pipe between said condenser and said boiler; means for operating said motor by said dynamo; and means for regulating the electric current to said motor.

2. The combination of a car platform; trucks therefor; an electric motor for driving said trucks; a dynamo on said platform; a steam turbine on said platform for driving said dynamo; means for creating a continuous circulation in said boiler and turbine; a water-cooled condenser into which the exhaust from the turbine passes; a connecting pipe between said condenser and boiler; a cooling tower on said platform; a tank therefor; means for pumping the contents of said tank from said condenser into said cooling tower; means for operating said motor by said dynamo; and means for regulating the electric current to said motor.

3 The combination of a car platform; trucks therefor; an electric motor for driving said trucks; a dynamo on said car platform provided with a plurality of revoluble disks united in series; means carried by said platform for driving said dynamo; means for cutting out a portion of said disks; and means for operating said motor by said dynamo.

4. The combination of a car platform; a steam generator carried thereby; a generator of electricity driven by said steam generator; a motor in circuit with said generator of electricity for moving said platform; a water-cooled condenser; and a cooling device connected to said condenser.

5. The combination of a car platform; a steam generator carried thereby; a generator of electricity driven by said steam generator; a motor in circuit with said generator of electricity; a water-cooled condenser; a cooling device connected to said condenser; and wings extending from said cooling device adapted to provide a current of air through said cooling device by the movement of the car.

6. The combination of a car platform; a steam generator carried thereby; a generator of electricity driven by said steam generator; a motor in circuit with said generator of electricity for moving said platform; a water-cooled condenser; a plurality of inclined shelves upon which the water from said condenser is ejected; means for cooling said water as it passes over said shelves; a tank beneath said shelves; and a pipe from said tank to said condenser.

Signed by me at Boston, Mass., this 20th day of June, 1907.

ERNEST C. KETCHUM.

Witnesses:
EDNA C. CLEVELAND,
NATHAN C. LOMBARD.